(12) United States Patent
Rebsdorf et al.

(10) Patent No.: US 8,408,870 B2
(45) Date of Patent: Apr. 2, 2013

(54) WIND TURBINE BLADE WITH CAMBERING FLAPS CONTROLLED BY SURFACE PRESSURE CHANGES

(75) Inventors: Anders Rebsdorf, Silkeborg (DK); Christian Medgaard, Silkeborg (DK)

(73) Assignee: Gamesa Innovation & Technology, S.L., Sarriguren, Navarra (ES)

( * ) Notice: Subject to any disclaimer, the term of this patent is extended or adjusted under 35 U.S.C. 154(b) by 937 days.

(21) Appl. No.: 12/200,943

(22) Filed: Aug. 29, 2008

(65) Prior Publication Data

US 2009/0074573 A1 Mar. 19, 2009

(30) Foreign Application Priority Data

Sep. 14, 2007 (ES) .................................. 200702454

(51) Int. Cl.
*F01D 5/00* (2006.01)
(52) U.S. Cl. ............................................ 416/23; 416/24
(58) Field of Classification Search ............... 416/23–24
See application file for complete search history.

(56) References Cited

U.S. PATENT DOCUMENTS

| | | | | |
|---|---|---|---|---|
| 3,586,267 A * | 6/1971 | Ingelman-Sundberg | ..... | 244/203 |
| 5,193,978 A * | 3/1993 | Gutierrez | ......................... | 416/24 |
| 5,375,324 A * | 12/1994 | Wallace et al. | ............. | 29/889.21 |
| 5,380,149 A * | 1/1995 | Valsamidis | ..................... | 415/2.1 |
| 2003/0099546 A1* | 5/2003 | Stiesdal et al. | ................ | 416/228 |
| 2007/0036653 A1* | 2/2007 | Bak et al. | .......................... | 416/98 |
| 2009/0074574 A1* | 3/2009 | Godsk et al. | ..................... | 416/41 |
| 2010/0259046 A1* | 10/2010 | Kota et al. | ........................ | 290/44 |

* cited by examiner

*Primary Examiner* — Jenny L Wagner
*Assistant Examiner* — Mark Tornow
(74) *Attorney, Agent, or Firm* — Ladas & Parry LLP

(57) ABSTRACT

A wind turbine having at least a blade comprising a first component having an aerodynamic profile with a leading edge, a trailing edge, and suction and pressure sides between the leading edge and the trailing edge, and a second component, attached to the trailing edge and/or to the leading edge of the first component in at least a part of the blade, comprising one or several upwards and/or downwards deflectable flaps that allow changing the flow over the blade, in which a device for deflecting each of the flaps comprises an actuating force or torque provided by scaling devices connected to a predetermined location in the outer surface of the blade, through a duct, so that the changes in the wind pressure at this location can be scaled to the actuating force or torque.

12 Claims, 3 Drawing Sheets

WIND TURBINE BLADE WITH CAMBERING FLAPS CONTROLLED BY SURFACE PRESSURE CHANGES

FIELD OF THE INVENTION

The invention relates to a wind turbine having rotor blades with cambering/deflectable flaps and in particular to rotor blades with deflectable flaps for optimizing the blade loads.

BACKGROUND

Wind turbines are devices that convert mechanical energy to electrical energy. A typical wind turbine includes a nacelle mounted on a tower housing a drive train for transmitting the rotation of a rotor to an electric generator.

The efficiency of a wind turbine depends on many factors. One of them is the orientation of the rotor blades with respect to the direction of the air stream, which is usually controlled by a pitch system that allows adjusting the pitch angle of the rotor blades for maintaining the rotor's speed at a constant value or within a given range. Otherwise, specially at high wind speeds, the load of the rotor will exceed the limits set by the wind turbine's structural strength.

There are two basic methods for controlling the power of a wind turbine changing the pitch angle of the rotor blades: the "pitch" control method and the "stall" control method.

In the "pitch" control method the rotor blade's pitch angle is changed to a smaller angle of attack in order to reduce power capture and to a greater angle of attack to increase the power capture. This method allows a sensitive and stable control of the aerodynamic power capture and rotor speed.

In the "stall" control method the rotor blade's pitch angle is changed to a greater angle of attack to the point where the flow separates at the rotor blade's surface, thus limiting the aerodynamic power capture.

The pitch regulated wind turbines can also use the pitch system to reduce the dynamic loads, either by cyclic pitch or by individual blade pitch. However, for large wind turbine blades it can be difficult to control the blade loading as the blade loading can vary over the blade length. As the rotor size is increasing, the pitching of the blades not necessarily provides an optimized loading along the whole blade because nor only wind shear, yaw errors and gust will affect the flow on the blade, but different gusts can hit the blade simultaneously or complex wind shear profiles with negative wind shear can occur.

In addition to the use of the pitch system there are known in the prior art some proposals in the prior art for optimizing the blade loads.

One known proposal is the use of small control surfaces such as Gurney flaps attached to the trailing edge for optimizing the blade loads. One disadvantage of Gurney flaps is the increase in aerodynamic noise from the free ends of the Gurney flaps and from the gaps in the blade where the Gurney flap is positioned.

Another known proposals are addressed to control the aerodynamic forces along the rotor blades by a continuous variation of the airfoil geometry in the leading edge region and trailing edge region along part of or along the whole blade span.

One of these proposals, disclosed in WO 2004/088130, relates to a design concept by which the power, loads and/or stability of a wind turbine may be controlled by a fast variation of the geometry of the blades using active geometry control (e.g. smart materials or by embedded mechanical actuators), or using passive geometry control (e.g. changes arising from loading and/or deformation of the blade) or by a combination of the two methods. In one preferred embodiment piezoelectric plates are to built in the trailing edge over part of the blade for modifying its geometry in order to reduce the blade loads. One disadvantage of the piezoelectric plates are the electrical cables that are necessary to bring power to them. These cables are woundable to electrical lightning and can easily be damaged in case of a lightning strike.

Another proposal, disclosed in U.S. Pat. No. 6,769,873, relates to a dynamically reconfigurable wind turbine blade assembly including a plurality of reconfigurable blades mounted on a hub, an actuator fixed to each of the blades and adapted to effect the reconfiguration thereof, and an actuator power regulator for regulating electrical power supplied to the actuators.

None of these proposals produces fully satisfactory results, therefore a continuing need exists for wind turbines having rotor blades with means for reducing the blade loads.

SUMMARY OF THE INVENTION

An object of the invention is to provide a wind turbine that, in addition to a pitch system, has special means for achieving an accurate control of the blade loads.

Another object of the invention is to provide a wind turbine having means for controlling the changes in the flow and hence optimizing the whole rotor performance and minimizing the pitch activity of the blades.

These and other objects of the present invention are met by providing a wind turbine with rotor blades comprising a first component having an aerodynamic profile with a leading edge, a trailing edge and suction and pressure sides between the leading edge and the trailing edge and a second component, attached to the trailing edge and/or to the leading edge of the first component in at least a part of the blade, which comprises an upwards and/or downwards deflectable flap that allows changing the flow over the blade, and means for deflecting the flap comprising an actuating force or torque provided by a scaling device connected to a predetermined location in the outer surface of the blade, through a duct, so that the changes in the wind pressure at said location can be scaled to said actuating force or torque.

Other features and advantages of the present invention will be understood from the following detailed description in relation with the enclosed drawings.

DETAILED DESCRIPTION OF PREFERRED EMBODIMENTS

Figure 1A:
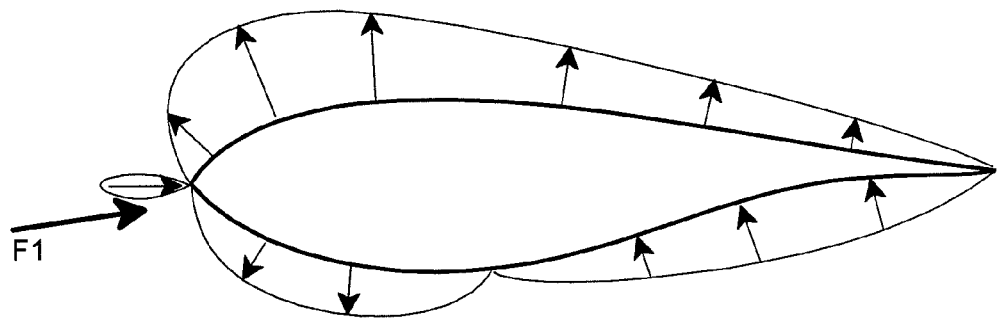
FIGS. 1a and 1b show the pressure on the surface of a wind turbine blade in two different flow conditions.

FIG. 1a shows the pressure on a wind turbine blade surface under a low flow velocity and small angle of attack (arrow F1).

Figure 1B:
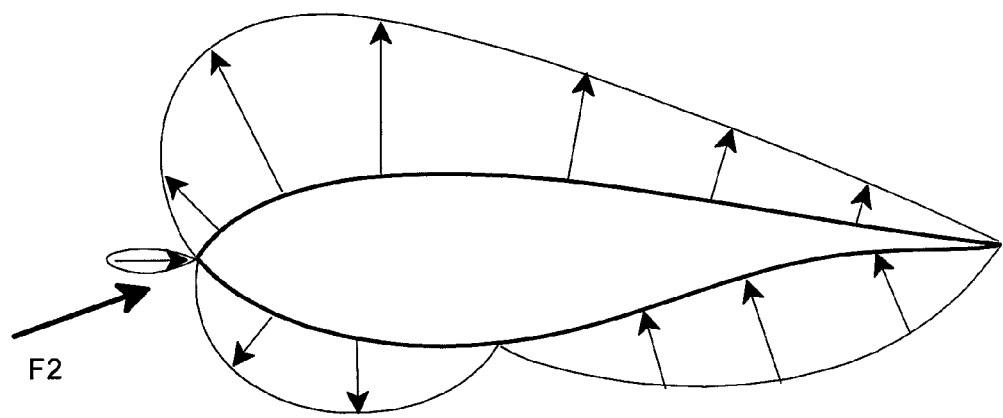

FIG. 1b shows the pressure on a wind turbine blade surface under a higher flow velocity and larger angle of attack (arrow F2).

Figure 2:
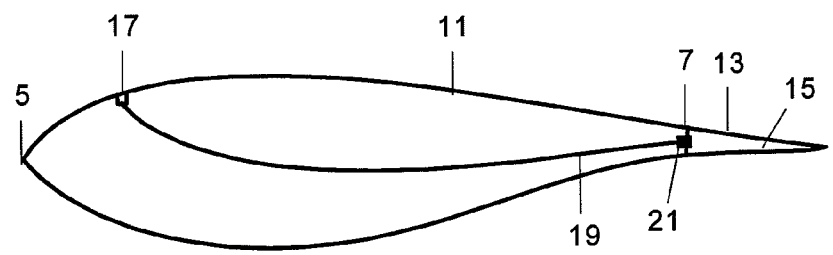
FIG. 2 is a schematic view of a wind turbine blade according to the present invention showing the second component attached to the trailing edge of the first component.

According to the present invention, as shown in FIG. 2, the wind turbine blade is formed by a first component 11 having a typical aerodynamic profile with a leading edge 5, a trailing edge 7 and suction and pressure sides between the leading edge 5 and the trailing edge 7 and one or several components 13.

The second components 13 are attached to the trailing edge 7 of the first component 11 and include deflectable flaps 15, 15'. The invention also comprises embodiments in which the second components 13 are similarly attached to the leading edge 5 of the first component 11.

According to the present invention, the surface pressure changes illustrated in FIGS. 1a and 1b are used as a direct or indirect mechanism for actuating said deflectable flaps 15, 15' for reducing the blade loads.

As shown in FIGS. 2, 3, 4 and 5 the duct 19 (it may be for instance a tube or a hose) is able to transfer the specific pressure from the hole 17 in the outer surface of the blade to the scaling device 21 in the inside of the blade to which it is connected. This means that if the pressure changes at the hole 17, where the duct 19 is connected to the surface, the pressure at the entry of the scaling device 21 changes to the same level and it is used to generate a force F or a torque T which changes in parallel to the change in pressure.

That force F or torque T is used for displacing a deflectable flap 15 upwards or downwards, within the limits set by the flap material and the type of joint between the flap 15 and the first component 11.

Figure 3A:
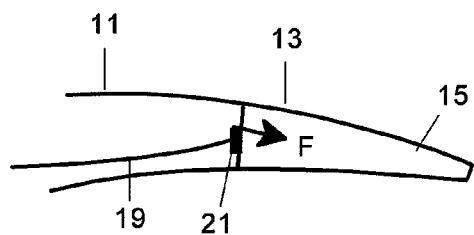
FIGS. 3a and 3b, 4a and 4b, 5a and 5b are schematic partial views of a wind turbine blade according to the present invention showing respectively three embodiments of the means used for achieving downwards and upwards deflections of the flap.
Figure 3B:
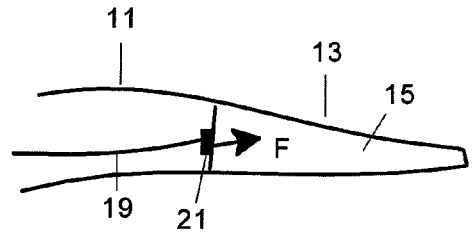
Figure 4A:
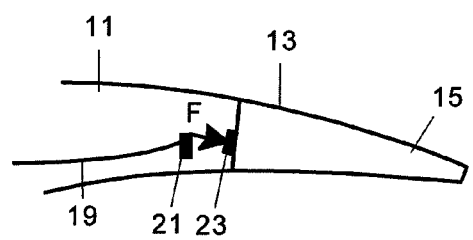
Figure 4B:
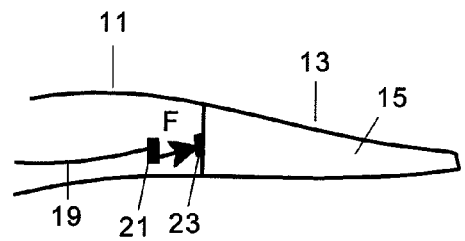

The force F can either be used directly to deflect a flap 15 as schematically shown in FIGS. 3a and 3b or indirectly to control any suitable actuating device 23 of the flap 15 as schematically shown in FIGS. 4a and 4b.

Figure 5A:
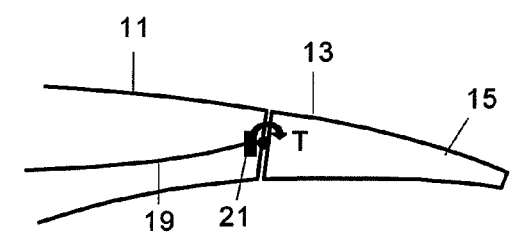
Figure 5B:
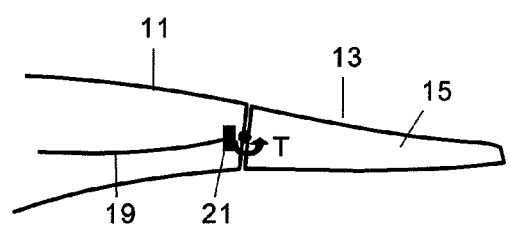

Similarly the torque T can be used directly for displacing a deflectable flap 15 upwards or downwards and change the shape of the trailing edge as schematically shown in FIGS. 5a and 5b.

Figure 6:
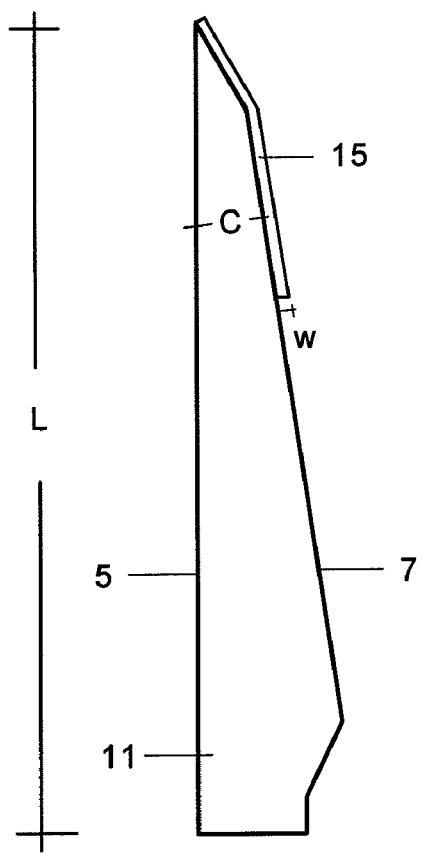
FIG. 6 is a schematic sectional view of a wind turbine blade incorporating a deflectable flap according to the present invention.
Figure 7:
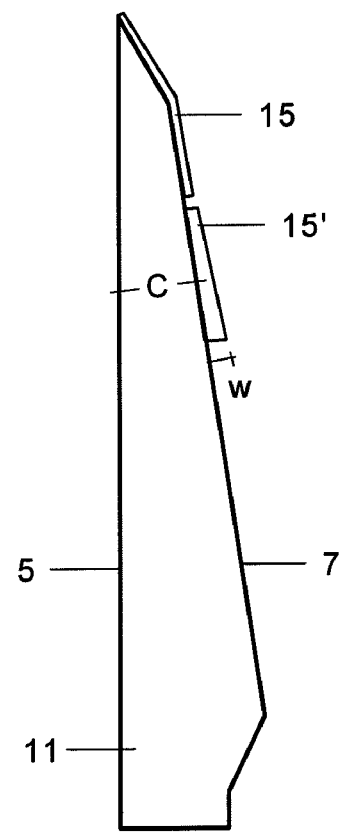
FIG. 7 is a schematic sectional view of a wind turbine blade incorporating two deflectable flaps according to the present invention.

The blade may include one individual flap 15 as shown in FIG. 6 or several flaps 15, 15' as shown in FIG. 7. In the latter case each flap 15, 15' has its own actuating means.

In a preferred embodiment, the width W of the flap or flaps 15, 15' is comprised between 1-20% of the chord length C in the center of the flap.

The width W of the flap or flaps 15, 15' may be constant or variable. In the first case the width will be usually smaller close to the tip region and larger towards the root section of the blade. In the latter case, the width W of the flap 15', as shown in FIG. 7 will decrease towards the tip of the blade.

In another preferred embodiment, the flap or flaps 15, 15' are attached to the blade leading edge 5 and/or to the blade trailing edge 7 in a section having a length lesser than ⅓ of the blade length L.

The flaps 15, 15' are preferably made in one piece of a flexible material such as rubber and it are attached to the first component 11 with means allowing its deflection as explained above. It can also be made as a pultruded profile eg. in glass fiber reinforced composite material.

Although the present invention has been fully described in connection with preferred embodiments, it is evident that modifications may be introduced within the scope thereof, not considering this as limited by these embodiments, but by the contents of the following claims.

The invention claimed is:

1. A wind turbine having blades wherein at least one of the blades consist of a first component (11) having an aerodynamic profile with a leading edge (5), a trailing edge (7), and suction and pressure sides between the leading edge (5) and the trailing edge (7) and a second component (13) attached to the end of leading edge (5) and/or to the trailing edge (7) of the first component (11) in at least a part of the blade, wherein:
   the second component (13) consist of one or several upwards and/or downwards deflectable flaps (15, 15') that allows changing the flow over the blade;
   the deflectable flaps (15, 15') consist of suction and pressure sides;
   each of said deflectable flaps (15, 15') has means for deflecting which comprise a scaling device (21) that, depending on the pressure detected at a predetermined location (17), to which the deflectable flap is connected by means of a duct (19), generates an actuating force or torque proportional to the changes in the wind pressure at said location (17).

2. A wind turbine according to claim 1, wherein the attachment of said one or several flaps (15, 15') to the second component (13) is actuated by the force generated by the scaling devices (21) that deflects one or several flaps (15, 15').

3. A wind turbine according to claim 2, wherein the scaling device (21) generates a force that deflects directly one or several flaps (15, 15').

4. A wind turbine according to claim 2, wherein the scaling device (21) generates a force that controls specific flap deflecting means (23) of said one or several flaps (15, 15').

5. A wind turbine according to claim 1, wherein the attachment of said one or several flaps (15) to the first component (11) is actuated by the torque generated by the scaling devices (21) which deflects one or several flaps (15, 15').

6. A wind turbine according to claims 1, wherein the width W of said one or several flaps (15, 15') is comprised between 1-20% of the chord length C of the blade in the center of the flap (15, 15').

7. A wind turbine according to claim 6, wherein the width W of at least one flap (15) is constant along the blade.

8. A wind turbine according to claim 6, wherein the width W of at least one flap (15') is variable along the blade.

9. A wind turbine according to claim 1, wherein said one or several flaps (15, 15') are attached to the blade leading edge (5) and/or to the blade trailing edge (7) in a section having a length lesser than ⅓ of the blade length L.

10. A wind turbine according to claim 1, wherein said one or several flaps (15, 15') are made in one piece of a flexible material.

11. A wind turbine according to claim 10, wherein said one or several flaps (15, 15') are made of rubber.

12. A wind turbine according to claim 10, wherein said one or several flaps (15, 15') are made of a pultruded fiber glass reinforced composite.

* * * * *